April 13, 1965   G. ACHILLES   3,177,738
APPARATUS FOR COMPENSATING UNBALANCE IN ROTATING BODIES
Filed Oct. 18, 1961

Inventor:
Günter Achilles

United States Patent Office 3,177,738
Patented Apr. 13, 1965

3,177,738
APPARATUS FOR COMPENSATING UNBALANCE IN ROTATING BODIES
Günter Achilles, Rixdorferstrasse 96, Berlin-Mariendorf, Germany
Filed Oct. 18, 1961, Ser. No. 145,806
Claims priority, application Germany, Oct. 24, 1960, H 40,855
2 Claims. (Cl. 74—573)

The present invention relates to an apparatus for compensating unbalance in rotating bodies, particularly in grinding wheels, wherein the magnitude of the unbalance is compensated by two balancing masses, the angular position of the unbalance being first determined by jointly turning the two balancing masses in the same direction of rotation and then compensating the magnitude of the unbalance by turning the balancing masses in opposite directions of rotation.

It is one object of the present invention to provide an apparatus for carrying out the above stated process.

It is another object of the present invention to provide an apparatus for compensating unbalances in rotating bodies, wherein the two balancing masses consist of planet wheels which mesh on the one hand with internally toothed rings surounding them and co-rotating through their housing with the rotary movements of the grinding wheel to be balanced, and on the other hand with central intermediate wheels, the sleeves or shafts of which carry other intermediate wheels which mesh with two planet wheel groups of a freely rotatable planet cage, while a third group of planet wheels of the planet cage is in engagement with a gearwheel co-rotating with the rotary movements of the housing, and the two first named planet wheel groups are in engagement with internally toothed adjusting rings, whereas the third planet wheel group is in engagement with an internally toothed, freely rotatable, but brakeable operating cap.

Figure 1:
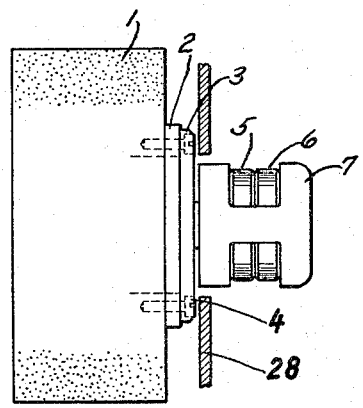
Figure 2:
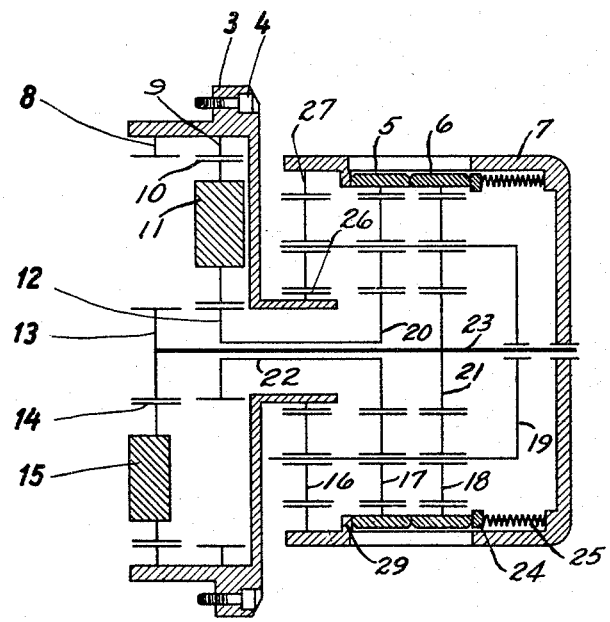

With these and other objects in view, which will become apparent in the following detailed description, the present invention will be clearly understood in connection with the accompanying drawings, in which:

FIG. 1 is an elevation of a grinding wheel provided with an unbalance and also a balancing device attached thereto, designed in accordance with the present invention; and FIG. 2 is a diagrammatic section through the balancing device on a larger scale.

Referring now to the drawing, the balancing device comprises a housing 3 which is detachably fastened by the screws 4 to the grinding wheel flange 2 of the grinding wheel 1 to be balanced. A rotatable operating cap 7, projecting out of the grinding wheel cover 28, of the balancing device contains two adjusting rings 5 and 6.

Internally toothed rings 8 and 9 are rigidly mounted in the housing 3. A planet wheel 14 meshes with the toothed ring 8 and a planet wheel 10 meshes with the toothed wheel 9. The planet wheel 14 meshes also simultaneously with the toothed wheel 13 and the planet wheel 10 with a toothed wheel 12 on a sleeve 22. The planet wheel 14 carries a balancing mass 15 and the planet wheel 10 carries a balancing mass 11.

The sleeve 22 is secured to the gearwheel 20, and the gearwheel 13 is secured by means of the shaft 23 to the gearwheel 21. The third gearwheel 26 is secured to the neck of the housing 3.

The planet cage 19 and the operating cap 7 are rotatably mounted on the shaft 23. The planet cage 19 carries the planet wheel groups 16, 17, 18. The planet wheel group 16 meshes on the one hand with the toothed wheel 26 and on the other hand with the internally toothed ring 27 which is secured to the operating cap 7. The planet group 17 meshes on the one hand with the toothed wheel 20 and on the other hand with the internally toothed adjusting ring 5. The planet wheel group 18 meshes with the toothed wheel 21 and with the adjusting ring 6. The adjusting rings 5 and 6 are pressed in the axial direction by means of the brake ring 24 against a shoulder 29 of the operating cap 7 by the force of a sprng 25.

The object of the entire gearwheel arrangement is to move the balancing masses 11 and 15 in such a manner that through the cooperation of the two balancing masses 11 and 15 an opposite, equally great counter-balance is formed to oppose in direction and magnitude the unbalance existing in the grinding wheel. The adjustment of the balancing masses 11 and 15 is possible during rotation of the grinding wheel 1.

The operating cap 7, projecting out of the grinding wheel cover 28, can be stopped although the grinding wheel 1 rotates. The adjusting rings 5 and 6 can be turned and thus the planet wheels 10 and 14 can be adjusted in their position in the rotating housing 3, which is secured to the grinding wheel flange 2. Through the operation of the adjusting ring 5, the planet wheel 10 with the balancing mass is moved through the gearwheels 17 and 20, sleeve 22, and gearwheel 12, and through the adjustment of the adjusting ring 6 the planet wheel 14 with the balancing mass 15 is moved through the gearwheels 18 and 21, the shaft 23, and the gearwheel 13.

The transmission of the adjusting movements of the adjusting rings 5 and 6 to the planet wheels 10 and 14 is possible, although the operating cap 7 is at rest and the housing 3 rotates, owing to the fact that the planet cage 19 with its planet groups 16, 17, 18 can rotate freely and the planet cage 19 during an adjusting movement of the adjusting rings 5 and 6 is held back against the gearwheel 26 and the internally toothed ring 27. Any relative variation of the position of the three internally toothed rings 27, 5 and 6 in relation to one another must necessarily result in a corresponding relative variation of the planet wheels 10 and 14, although the housing 3 is rotating.

The operation of the variation of the balancing masses 11 and 15 is rendered visible, if the mechanical unbalance vibrations emanating from the grinding wheel 1 are recorded by a mechanical oscillator and tuned to the speed of rotation of the grinding wheel 1 and indicated with amplification by a magic eye as a variation of the amplitude.

When the grinding wheel 1 having an unbalance starts rotation, both the operating cap 7 and ehe adjusting rings 5 and 6 also rotate synchronously. When the said grinding wheel is started up, the brake ring 24 prevents the adjusting rings 5 and 6 from slipping. In order to eliminate the unbalance of the grinding wheel 1, the operating cap 7 is first held fast, that is to say prevented from continuing to rotate, which has the consequence that the adjusting rings 5 and 6 also stand still. The two adjusting rings 5 and 6 are then both turned in one direction until a minimum unbalance is obtained. The two balancing masses 11, 15 have thus been brought into the correct angular position in relation to the unbalance of the grinding wheel 1. The two adjusting rings 5 and 6 are now turned in opposite directions, that is to say for example the adjusting ring 5 is turned the same angular distance to the left as the adjusting ring 6 is turned the same angular distance to the right. This rotation in opposite directions of the two adjusting rings 5, 6 is continued until the unbalance of the grinding wheel 1 has completely disappeared. The unbalance of the grinding wheel 1 and the joint counter-unbalance resulting from the two balancing masses 11, 15 now cancel one another.

In general, it is advantageous to use two unbalancing masses 11 and 15 of the same size. The apparatus according to the present invention may however be modified by using unequal balancing masses 11 and 15, which then act on likewise unequal radii, so that in each case the product of mass and radius has the same magnitude.

The apparatus according to the present invention for compensating an unbalance in rotating bodies offers various advantages. Since the housing 3 forms a self-contained unit with the planet gearing and the operating cap 7, no fixed point on the machine is necessary. Back pressure forces and adjusting forces which could affect the grinding wheel spindle do not occur. The entire unbalance apparatus can be removed and used on different machines. The grinding wheel spindle need not be drilled. Since the arrangement and the size of the unbalancing masses are not to any considerable extent hindered by structural circumstances, the counter-balance applied by the two balancing masses can be selected to be so great that even a grinding wheel with considerable unbalance or a very broad grinding wheel with great mass can be balanced. Owing to the fact that the planet wheels with their balancing masses 10, 11 and 14, 15 serve the dual purpose of gearing parts and balancing weights, the gearing following it can be made simpler. Since the planet wheel gearing is a reduction gear with a high transmission ratio, it locks itself when the wheel starts to run and the planet wheels do not change their positions.

While I have disclosed one embodiment of the present invention, it is to be understood that this embodiment is given by example only and not in a limiting sense, the scope of the present invention being determined by the objects and the claims.

Having described my invention, what I claim as new and desire to secure by Letters Patent is:

1. An apparatus for compensating unbalances in rotating bodies, particularly grinding wheels, comprising
   a cylindrical housing releasably secured to a rotating body to be balanced,
   an operating cap disposed coaxially with and adjacent to said housing,
   two internally toothed rings spaced axially from each other and rigidly secured in said housing,
   a first planet wheel disposed in said housing and meshing with one of said internally toothed rings,
   a second planet wheel disposed in said housing and meshing with the other of said internally toothed rings,
   a shaft extending axially through said housing and through said operating cap,
   a sleeve disposed coaxially with and surrounding said shaft,
   a first toothed wheel keyed to said shaft and meshing with said first planet wheel,
   a second toothed wheel keyed to said sleeve and meshing with said second planet wheel,
   each of said planet wheels including a balancing mass,
   a first gear wheel keyed to said sleeve and disposed within said operating cap,
   a second gear wheel keyed to said shaft and disposed within said operating cap,
   said second gear wheel thus rotating with said first toothed wheel,
   said housing having a neck portion of reduced diameter,
   a third gear wheel secured to the outer surface of and rotating with said neck portion of said housing,
   a planet cage disposed coaxially with and rotatably about said sleeve,
   said planet cage including a plurality of second shafts disposed parallel to the longitudinal axis of said shaft,
   a third internally toothed ring secured to the inner surface of said operating cap,
   a first adjusting ring and a second adjusting ring rotatably mounted in and accessible from the outside of said operating cap,
   said first adjusting ring including a fourth internally toothed ring,
   said second adjusting ring including a fifth internally toothed ring,
   a first group of third planet wheels rotatably mounted on said second shafts and meshing with said third gear wheel as well as with said third internally toothed ring,
   a second group of fourth planet wheels rotatably mounted on said second shafts and meshing with said first gear wheel as well as with said fourth internally toothed ring of said first adjusting ring, and
   a third group of fifth planet wheels rotatably mounted on said second shafts and meshing with said second gear wheel, as well as with said fifth internally toothed ring of said second adjusting ring,
   so that the unbalance is compensated by said balancing masses of said first and second planet wheels by first determining the angular position of said unbalance by jointly turning said two balancing masses in the same direction of rotation and thereafter compensating for said unbalance by turning said balancing masses in opposite directions of rotation relative to each other by operation of said adjusting rings.

2. The apparatus, as set forth in claim 1, wherein said adjusting rings are disposed adjacent each other in axial direction,
   said operating cap forms a shoulder, and
   which includes a spring-biased brake ring disposed in said operating cap and engaging the end face of one of said adjusting rings, so that said brake ring forces said adjusting rings against said shoulder.

References Cited by the Examiner

UNITED STATES PATENTS 2,241,637  5/41  Ernst et al. _____ 74—573 X

FOREIGN PATENTS 674,912  7/52  Great Britain.

BROUGHTON G. DURHAM, *Primary Examiner*,